May 24, 1938.    W. S. WATTS    2,118,123
CLUTCH CONTROL MECHANISM
Filed Oct. 20, 1933    2 Sheets-Sheet 1

INVENTOR.
WILLIAM S. WATTS
BY
ATTORNEY

May 24, 1938.  W. S. WATTS  2,118,123

CLUTCH CONTROL MECHANISM

Filed Oct. 20, 1933   2 Sheets-Sheet 2

INVENTOR.
WILLIAM S. WATTS
BY
ATTORNEY

Patented May 24, 1938

2,118,123

UNITED STATES PATENT OFFICE 2,118,123

CLUTCH CONTROL MECHANISM

William S. Watts, South Bend, Ind., assignor to Bendix Aviation Corporation, South Bend, Ind., a corporation of Delaware Application October 20, 1933, Serial No. 694,437

8 Claims. (Cl. 192—.01)

This invention relates in general to power operated clutch control mechanism for an automotive vehicle, and in particular to means for regulating the clutch engaging operation of the mechanism.

The invention is directed to the improvement of the so-called automatic clutch of the present day wherein the throttle operating means of the vehicle controls the valve mechanism of a manifold vacuum operated motor operably connected to the clutch. In this type of mechanism the power element of the clutch motor is subjected to a varying differential pressure to regulate the disengagement and engagement of the clutch, and it is an object of the present invention to provide means for varying said differential pressure to effect a controlled engagement of the clutch, the operation of said means being a function of the operation of the engine. One of the well-known commercial types of clutch motor or clutch operator comprises a double-ended cylinder housing a reciprocable piston operably connected to the clutch pedal, and there is provided a three-way or dump valve constituting part of the aforementioned control valve mechanism and preferably operated by the accelerator, said valve serving to alternately connect one end of the cylinder with the manifold and atmosphere to initiate the clutch disengaging and engaging operations of the motor. Other valve means are provided for controlling the efflux of air from the other end of the cylinder to vary the loading of the clutch plates, and one important phase of the present invention is directed to the construction and mode of operation of said latter valve means.

To this end there is provided a pressure differential operated bleed valve incorporated in the vent from the last-mentioned end of the cylinder, the valve and the means for operating the same being so constructed and so interconnected with the engine of the vehicle as to reflect the R. P. M. of the engine. This is an important feature of the invention, for heretofore the bleed valve has been operated by means, such for example as the manifold vacuum, which however is subject to extraneous variables, resulting in undesired variable operation of the valve. The prior art controlling means for the bleed valve does not suggest clutch operating mechanism including a valve structure such as disclosed by the instant invention wherein the mechanism provides for a loading of the clutch plates to engage the clutch, the loading being in proportion to the engine torque.

In a preferred embodiment of the invention the bleed valve is operated in accordance with the pressure developed by the water pump of the vehicle.

Yet another object of the invention is to provide a pressure differential operated clutch operator wherein the throttle operating means of the vehicle serves as a common control means for the throttle and the control valve mechanism of the operator, said valve mechanism comprising a three-way or dump valve for initiating the clutch disengaging and engaging operations of the clutch operator, and further comprising a power operated relay valve of the balanced type to provide a follow-up control of the clutch operator in effecting its clutch engaging operation, said relay valve constituting the aforementioned bleed valve operative in accordance with the engine torque.

A further object of the invention is to provide an inertia operated safety device for obviating excessive acceleration of the vehicle, more commonly described as a jerking clutch action, and to combine such device with the aforementioned bleed valve mechanism to provide a single compact unit.

Another object of the invention is to provide a clutch control mechanism operative to completely separate the clutch plates to disengage the clutch, and further operative to effect two distinct stages of clutch engaging movement of the driven clutch plate, the first stage being relatively rapid and serving to bring the plates just to the point of engagement and slightly engaged and the second stage being relatively slow and accomplished in a succession of short movements to effect a progressively increasing loading of the plates to engage the clutch.

An important feature of the invention lies in the provision of means for automatically terminating the aforementioned first and rapid stage of movement when the clutch plates are slightly engaged, thus compensating for wear of the clutch facings and obviating an adjustment of the parts throughout the life of the facings.

Other objects of the invention and desirable details of construction and combinations of parts will become apparent from a detailed description of certain embodiments of the invention, described in detail in the following specification taken in conjunction with the accompanying drawings illustrating said embodiments, in which.

Figure 1:
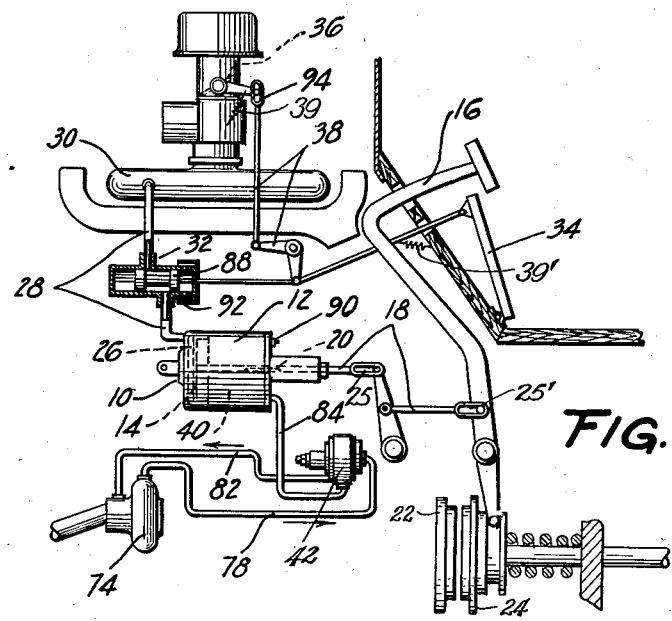
Figure 1 is a diagrammatic view of one embodiment of the clutch control mechanism constituting the present invention.

Referring now to the preferred embodiment of the invention disclosed diagrammatically in Figure 1, there is provided a clutch motor 10 comprising a double-ended cylinder 12, preferably pivotally mounted to a fixed portion of the vehicle, said cylinder housing a reciprocable piston 14 constituting the power element of the motor and operably connected to a clutch pedal 16 by nkage 18: said linkage includes a connecting rod slotted at 20 for a purpose to be described hereinafter. The clutch pedal serves to operate a conventional clutch comprising driving and driven plates 22 and 24 respectively. Pin and slot lost motion connections 25 and 25' provide a means, together with the power mechanism and clutch pedal 16, whereby the clutch may be operated either manually or by power, the slot 25' providing a means whereby the clutch pedal may be depressed without affecting the power means. A left compartment 26 of the cylinder 12 is alternately evacuated and vented to successively disengage the clutch and initiate an engagement thereof by means of a conduit 28 connecting the clutch motor with the atmosphere and with an intake manifold 30 of an internal-combustion engine, not shown, a three-way valve 32 being incorporated in the conduit to effect the aforementioned control. The valve 32 is arranged to be operated by an accelerator 34, the latter also operating a throttle valve 36 of the engine, a linkage 38 interconnecting these parts. Springs 39 and 39' serve to return the throttle 36 and accelerator 34 to their respective "off" positions upon release of the accelerator. No claim is made to the aforementioned construction, for the same is disclosed and claimed in the patent to Ross I. Belcia No. 1,470,272, dated October 9, 1923.

The invention is specifically directed to valve means for regulating the efflux of air from the right compartment 40 of the cylinder 12 to thereby control the engagement of the clutch. The valve structure is disclosed in detail in Figure 2 and includes a casing comprising interconnected end members 42 and 44 and a central member 46, the three members housing diaphragm members 48 and 50 secured in position by the peripheral edges of the casing members and providing liquid-receiving chambers A and B and air-receiving chambers C and D. To the center of the diaphragm 48 is secured a metal disk or weight member 52 recessed in its center to house a compression spring 54, the latter interposed between cup-shaped washers or retainers 56 and 58. A stop member 60 is adjustably mounted in the casing end member 42 and abuts the retainer 56, providing a means to vary the compression of the spring 54. The diaphragm 48, disk 52 and retainer 58 are clamped together by a bolt 62 and nut 64, and a thrust pin 66, screw-threaded into the bolt 62, is adapted to disconnectedly engage a rivet 68, the latter serving as a means for securing a weight member 70 to the diaphragm 50. The diaphragm 48 is normally seated, with the engine idling, upon an annularly raised portion or boss 72 integral with the casing member 46, that portion of the diaphragm 48 contacting the boss 72, together with the boss, constituting a bleed or blowoff valve referred to in greater detail hereinafter.

The delivery side of an engine driven water pump 74 of the vehicle is connected to a port 76 in the casing 44 by a conduit 78, and the inlet side of the pump is connected to a port 80 in the casing member 42 by a conduit 82. It is important that the pump be of a design whereby the developed pressure is directly proportional to the crank shaft R. P. M. of the engine. A bleed conduit 84 interconnecting the compartment 40 of the cylinder with a port 86 in the valve casing member 46 completes the more important elements of the construction.

Figure 3:
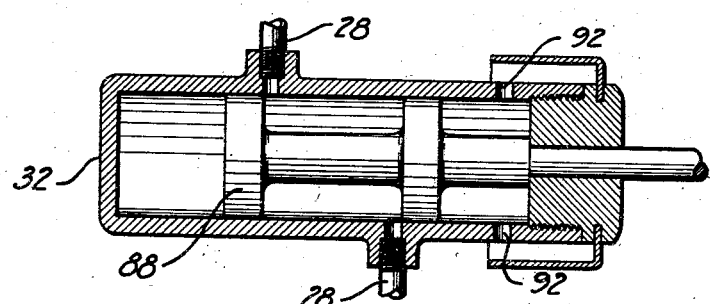
Figure 3 is an enlarged sectional view of the three-way control valve of Figure 1.
Figure 4:
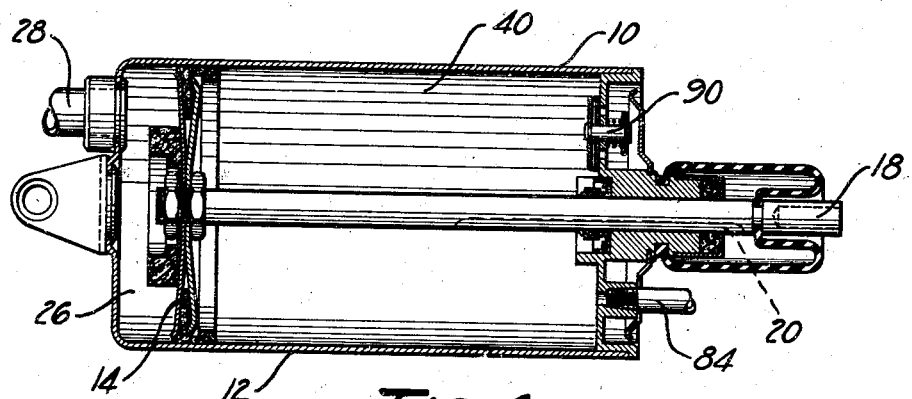
Figure 4 is an enlarged sectional view of the clutch motor of Figure 1.

Referring now to the operation of the above described mechanism, with release of the accelerator the throttle is closed to idle the engine, thereby producing, by virtue of the pumping action of the engine pistons, a manifold vacuum of some twenty inches of mercury at sea level. The three-way valve 32 is, with the release of the accelerator, operated to intercommunicate the manifold with the left compartment 26 of the cylinder, a spool member 88 of the three-way valve being moved to the right, Figure 3, to effect this connection. The compartment 26 is accordingly partially evacuated, the atmosphere acting upon the right side of the piston 14, and entering the cylinder via an inwardly opening check valve 90, serving to move the piston to the left as disclosed in Figure 1 to disengage the clutch.

When it is desired to engage the clutch either to start the vehicle, or after a gear shifting operation, or possibly after a free wheeling operation, the accelerator is depressed to move the valve member 88 to the left, closing off the connection with the manifold and venting the compartment 26 to the atmosphere via atmospheric ports 92 in the valve 32. The throttle is, of course, also open with the depression of the accelerator, however preferably after the valve member 88 has been moved to vent the cylinder, there being provided a lost motion connection 94 in the throttle linkage to accomplish this end. With the venting of the compartment 26 the conventional clutch springs, not shown, immediately act to engage the clutch, the mode of engagement being determined by the mode of efflux of air from the right compartment 40 of the cylinder 12. The air from the compartment passes rapidly from the cylinder via the slot 20, effecting a relatively rapid movement of the clutch pedal to take up the clearance between the clutch plates. When the piston 14 and connecting rod have moved to such a position that the slot 20 is either covered by the end wall of the cylinder or lies beyond said wall outside the cylinder, air may no longer pass from the cylinder via the slot: the air, however, continues to rapidly flow from the compartment 40, via the conduit 84, ducts 96 and 98 in the casing member 46, thence into the chamber C and through the bleed valve, which is at this time slightly open owing to the superatmospheric pressure in the chamber, and out to the atmosphere via a duct 100 in the casing member 46. The spring 54 is of such strength as to be compressed by the escaping air to open the bleed valve, said valve remaining open however only until the clutch plates have contacted with a predetermined relatively slight load. When this occurs the relatively high gaseous pressure within the compartment 40 of the cylinder automatically drops to an amount substantially above the pressure of the atmosphere and the spring 54 automatically acts to seat the bleed valve, this operation being known in the art as a lapping of the valve. Thus whenever the clutch is engaged the plates are always initially loaded to a predetermined amount irrespective of the worn-in condition of the clutch facings, said loading depending upon the proportioning of the parts and the strength of the clutch spring and spring 54.

The above-described operation preferably takes place during the taking up of the lost motion at 94 and prior to the opening of the throttle, the parts of the mechanism being adjusted to effect this result. With a continued depression of the accelerator the throttle is opened to speed up the engine and the water pump 74 driven thereby, resulting in an increase of the hydrostatic pressure in the chamber B acting on the diaphragm 50. This pressure, together with the superatmospheric pressure acting on the right side of the diaphragm 48 in chamber C, acts to again crack the bleed valve, that is unseat the diaphragm 48, permitting a limited amount of air to escape from the compartment 40. This may be described as a "blow-off" action of the valve effecting a slight "blowing down" of the clutch motor. The diaphragm 48, however, once unseated acts almost immediately thereafter to seat again, the action being very fast, for the pressure developed by the water pump in chamber B is insufficient of itself to overcome the spring 54 once the gaseous pressure of the air in chamber C is reduced by the above-described blow-off action of the bleed valve. With the escape of a limited quantity of air from the compartment 40 of the cylinder the loading of the clutch plates is correspondingly increased by a predetermined amount in pounds.

Now if the throttle is further operated the above cycle of operations is repeated, the loading of the clutch plates being increased by the action of the clutch springs until the system is again in equilibrium, that is when the bleed valve is reseated. It will be noted that as the hydrostatic pressure in chamber B increases the absolute pressure within the compartment 40 and chamber C proportionately decreases, for with each successive increment of load placed upon the clutch plates by the clutch springs the last-mentioned pressure must necessarily be decreased in proportion. In other words, the sum of the forces acting to unseat the diaphragm 48 and resulting from the additive effect of the pressures in the chambers B and C is substantially equal to the force exerted by the spring 54 when the system is in equilibrium and the bleed valve is seated, and the pressure in chamber C decreases proportionately with the increase in pressure in chamber B. Furthermore, in order to unseat the bleed valve the pressure in chamber B must be increased so that the force resulting from the sum of the pressures in chambers B and C exceeds the force exerted by the spring 54, for it will be obvious that the maximum pressure developed in either chamber B or C is insufficient of itself to unseat the valve. It therefore follows that the force exerted by the clutch springs at any given instant after the clutch plates have contacted is directly proportional to the pressure in the chamber B, and therefore directly proportional to the hydrostatic pressure developed by the engine. This, however, is exactly the end desired, for the loading of the clutch should be regulated in accordance with the speed of the engine, and the resultant torque of the engine driven clutch plate or flywheel to effect the desired smooth engagement of the clutch and also obviate any possible stalling of the engine.

With the above described mechanism there is provided in a relatively simple fluid operated clutch operator or so-called automatic clutch the principal advantages of the more complicated centrifugal clutch of the day. Furthermore, it should be noted that the balanced valve mechanism suggested provides the much desired follow up to-lap type of control of the clutch motor.

Figure 2:
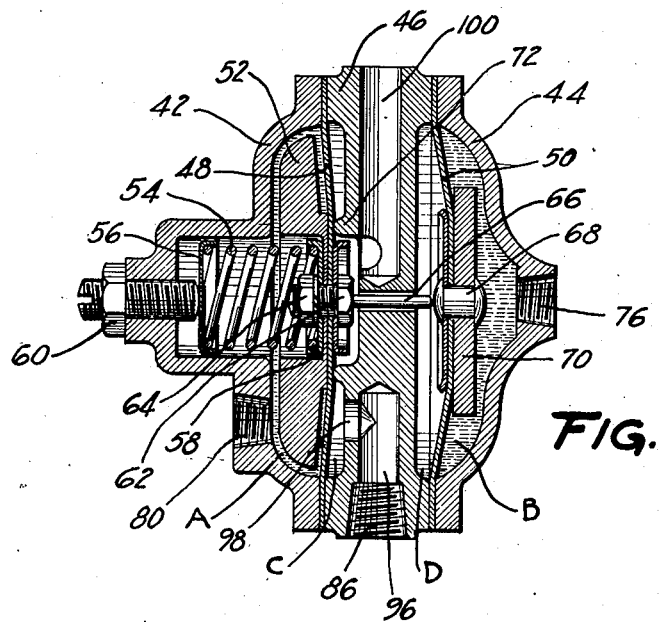
Figure 2 is a sectional view of the combined inertia safety device and bleed valve of the mechanism of Figure 1.

The valve mechanism of Figure 2 embodies an additional feature in providing an inertia operated means for automatically controlling the clutch engaging operation of the clutch motor to limit the acceleration of the vehicle to a predetermined maximum. It is to this end that the weights 52 and 70 are provided. Describing this phase of the operation, the mass of the weights and the flexibility of the diaphragms 48 and 50 are so determined as to automatically effect a seating of the bleed valve when and if the acceleration of the vehicle exceeds a predetermined factor, which is preferably slightly below that which would be objectionable to the passengers, that is below that producing a noticeable jerking action of the vehicle. The developed acceleration is, of course, among other features a function of the clutch plate loading, the engine torque, the weight of the vehicle and the wind and traction resistance. Thus should the acceleration exceed the aforementioned maximum, the bleed valve will automatically close, trapping the air in the compartment 40, and maintain the then existing clutch loading until the acceleration is reduced sufficiently to return the weights and diaphragms to their normal positions relative to the valve casing members. This inertia action is extremely delicate and rapid in its action, and in practice it has been found that all objectionable jerking of the vehicle is eliminated by the disclosed device.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle, the combination with an internal-combustion engine and a clutch, of power means for controlling the operation of the clutch, said means comprising a clutch motor operably connected with the clutch, and valve means for said motor including a pressure sensitive follow-up to-lap bleed valve said valve being operable, as a function of the speed of the engine, to control the clutch engaging operation of said motor.

2. In an automotive vehicle, the combination with an internal-combustion engine and a clutch, of power means for controlling the operation of the clutch, said means comprising a clutch motor operably connected with the clutch, and valve means for said motor including an engine controlled pressure sensitive follow-up to-lap valve means for controlling the clutch engaging operation of said motor, said follow-up to-lap valve being operable in accordance with the speed of the engine.

3. In a clutch control mechanism, a clutch operating motor, and valve mechanism for controlling said motor comprising a power operated balanced follow-up to-lap type of valve for regulating the clutch engaging operation of said motor.

4. In an automotive vehicle provided with a clutch and an internal-combustion engine having an intake manifold, manifold vacuum operated power means operably connected to the clutch, said power means comprising a pressure differential operated motor, a three-way valve for controlling the clutch disengaging operation of said motor and initiating the clutch engaging operation thereof, and a follow-up to-lap type of bleed valve means for controlling the clutch engaging operation of the motor, said follow-up to-lap valve being operable as a function of the engine speed to progressively change the gaseous pressure within said motor.

5. In an automotive vehicle provided with an internal-combustion engine, an accelerator and a clutch, power means for operating the clutch, an accelerator operated three-way control valve for said power means operative to initiate the clutch disengaging and engaging operations of said means, and a fluid power operated balanced type of control valve for variably controlling the clutch engaging operation of said power means.

6. In a clutch control mechanism provided with a pressure differential operated motor, control valve mechanism for said motor comprising means for regulating the clutch engaging operation of said motor, said means comprising a valve casing housing a plurality of spring operated weighted diaphragms, one of said diaphragms adapted to seat upon a portion of the valve casing to provide a bleed valve, said parts being so constructed and arranged as to provide a combined inertia and power operated valve mechanism.

7. In a clutch control mechanism for an automotive vehicle provided with a clutch including clutch springs, a pressure differential operated clutch motor operably connected with the clutch, and valve mechanism for controlling the clutch engaging operation of said motor, said mechanism comprising a valve casing, a power operated member within said casing adapted to normally seat upon a portion of said casing and providing with said portion a bleed valve, a spring member acting upon said power operated member to seat said bleed valve, fluid transmitting means interconnecting one end of said motor and bleed valve, said parts being so constructed and arranged that during the engagement of the clutch under the action of the clutch springs the bleed valve will remain open to effect a relatively rapid efflux of power fluid from the clutch motor, until the clutch plates are engaged at a predetermined load whereupon the bleed valve will automatically close to terminate a relatively rapid engaging movement of the clutch.

8. A mechanism for controlling the operation of the clutch of an automotive vehicle comprising a clutch operating motor, including a compartment, and valve mechanism for controlling the operation of said motor, said mechanism comprising a pressure sensitive follow-up to-lap valve, operable in accordance with the speed of the vehicle engine, for controlling the pressure of power means within said compartment.

WILLIAM S. WATTS.